US012438291B2

(12) United States Patent
Kalyoncu et al.

(10) Patent No.: US 12,438,291 B2
(45) Date of Patent: Oct. 7, 2025

(54) SPRING CLAMP TERMINAL

(71) Applicant: KLEMSAN ELEKTRİK ELEKTRONIK SAN. VE TIC. A.S., Izmir (TR)

(72) Inventors: Murat Kalyoncu, Izmir (TR); Gurcan Gulsever, Izmir (TR); Serkan Kaba, Izmir (TR)

(73) Assignee: KLEMSAN ELEKTRIK ELEKTRONIK SAN. VE TIC. A.S., Izmir (TR)

( * ) Notice: Subject to any disclaimer, the term of this patent is extended or adjusted under 35 U.S.C. 154(b) by 0 days.

(21) Appl. No.: 18/258,215

(22) PCT Filed: Oct. 24, 2022

(86) PCT No.: PCT/TR2022/051171
§ 371 (c)(1),
(2) Date: Jun. 19, 2023

(87) PCT Pub. No.: WO2024/043847
PCT Pub. Date: Feb. 29, 2024

(65) Prior Publication Data

US 2024/0380135 A1 Nov. 14, 2024

(30) Foreign Application Priority Data

Aug. 26, 2022 (TR) ................................ 2022/013464

(51) Int. Cl.
*H01R 4/48* (2006.01)

(52) U.S. Cl.
CPC ....... *H01R 4/4833* (2023.08); *H01R 4/48185* (2023.08)

(58) Field of Classification Search
CPC .. H01R 4/4833; H01R 4/48185; H01R 4/483; H01R 4/4809; H01R 4/4821; H01R 4/48365; H01R 4/4819; H01R 4/4826; H01R 4/4842; H01R 4/4844; H01R 4/48455; H01R 4/485
USPC .......................................................... 439/835
See application file for complete search history.

(56) References Cited

U.S. PATENT DOCUMENTS 10,498,050 B1 * 12/2019 Liang ........................ H01R 9/24
11,201,417 B1 12/2021 Chen
2018/0145428 A1 5/2018 Meyer
2020/0313338 A1 10/2020 Pan

FOREIGN PATENT DOCUMENTS

CN 214428778 U 10/2021

* cited by examiner

*Primary Examiner* — Christopher M Koehler
*Assistant Examiner* — Gregory L Mangot
(74) *Attorney, Agent, or Firm* — Bayramoglu Law Offices LLC

(57) ABSTRACT

A connection terminal for electrically connecting at least two cables includes at least one body; at least one cable socket for allowing the cable to be passed through the said body; at least one bridge for providing the electrical transmission between the cables; at least one spring with at least one pressing arm that exerts a force on the cable to contact the cable with the said bridge; and at least one latch for controlling the position of the said spring.

4 Claims, 4 Drawing Sheets

(b)

(a)

SPRING CLAMP TERMINAL

CROSS REFERENCE TO THE RELATED APPLICATIONS

This application is the national phase entry of International Application No. PCT/TR2022/051171, filed on Oct. 24, 2022, which is based upon and claims priority to Turkish Patent Application No. 2022/013464, filed on Aug. 26, 2022, the entire contents of which are incorporated herein by reference.

TECHNICAL FIELD

The invention is a connection terminal for electrically connecting at least two cables, including at least one body; at least one cable socket for allowing the cable to be passed through the said body; at least one bridge for providing the electrical transmission between the cables; at least one spring with at least one pressing arm that exerts a force on the cable to contact the cable with the said bridge; and at least one latch for controlling the position of the said spring.

BACKGROUND

Spring clamp terminals are apparatuses that serve to provide the electrical connection of two or more cables. The main purpose of using spring clamp terminals in the cable connection is to provide a secure connection between the cables. The most effective way to prevent faulty wiring and to make a regular connection is to use spring clamp terminals. In addition, since the cables can be removed or attached quickly over the spring clamp terminal, the spring clamp terminals facilitate the changes to be made in the wiring.

Today, spring-loaded ratchet spring clamp terminals are used to provide a more practical connection with old screw-type spring clamp terminals. The basic working principle of the spring clamp terminals can be summarized as contacting the conductive ends of the cables to a conductive bridge in the spring clamp terminal body and thus transmitting electricity from one cable to another with this bridge. The conductive end of the cable must be in contact with the bridge to ensure uninterrupted electrical transmission. The spring clamp terminals known in the present art are intended for the connection of solid (single core) cables only. However, there is a one-way non-removable structure in the current technical cable connection.

Application No. CN214428778U known in the literature relates to a cable connection apparatus. It is an object of the invention disclosed in the application to improve the structure of both the guide unit and the lever.

All the problems mentioned above have made it necessary to make an innovation in the relevant technical field as a result.

SUMMARY

The present invention relates to a connection terminal to eliminate the above-mentioned disadvantages and bring new advantages to the relevant technical field.

It is an object of the invention to provide a connection terminal for the connection of solid (single-core, rigid) cables as well as multi-core (flexible) cables with ferrules.

Another object of the invention is to provide a connection terminal with the cable connection removed and installed.

In order to achieve all the objectives that are mentioned above and will emerge from the following detailed description, the present invention is a connection terminal for electrically connecting at least two cables, including at least one body; at least one cable socket for allowing the cable to be passed through the said body; at least one bridge for providing the electrical transmission between the cables; at least one spring with at least one pressing arm that exerts a force on the cable to contact the cable with the said bridge; and at least one latch for controlling the position of the said spring. Accordingly, its novelty is that the said latch includes at least one shaft portion in contact with the pressing arm in such a way that when it is moved in a first direction, it brings the pressing arm to a loaded position where the contact between the cable and the bridge is interrupted, the latch has at least one protrusion that can make a sliding movement in the loading direction by resting against at least one sliding surface on the body to facilitate the movement of the shaft portion in the said first direction. Thus, a suitable and detachable connection terminal is provided for all single-core, ferrule, and multi-core cables.

A possible embodiment of the invention is characterized in that that the body includes at least one fixing slot configured to secure the latch in the said loaded position by receiving the projection therein. Thus, it is ensured that the latch remains fixed in the loaded position and the cable can be easily taken out.

Another possible embodiment of the invention is characterized in that it includes at least one cover having at least one movement channel with a gap provided to guide the movement of the shaft portion in the first direction. This prevents the latch from dislodging during its movement.

Another possible embodiment of the invention is characterized in that the said cable socket includes at least one narrow portion which is sized to receive the conductive end of the cable and at least one wide portion which is wider than the said narrow portion and wide enough to receive the portion of the cable with the insulating coating on it. Thus, it is ensured that the cable can fully fit into the connection terminal.

REFERENCE NUMERALS

10 Connection Terminal
11 Block
20 Body
21 Sliding Surface
22 Fixing Slot
30 Spring
31 Pressing Arm
32 Supporting Arm
40 Latch
41 Shaft Portion
42 Extension
50 Bridge

60 Cover
61 Cable Socket
611 Wide Portion
612 Narrow Portion
62 Movement Channel
62*a* First Direction
62*b* Second Direction
(a) Loaded Position
(b) Released Position
(I) Loading Direction
(II) Release Direction

DETAILED DESCRIPTION OF THE EMBODIMENTS

In this detailed description, the subject of the invention is explained with examples that do not have any limiting effect only for a better understanding of the subject.

Figure 1:
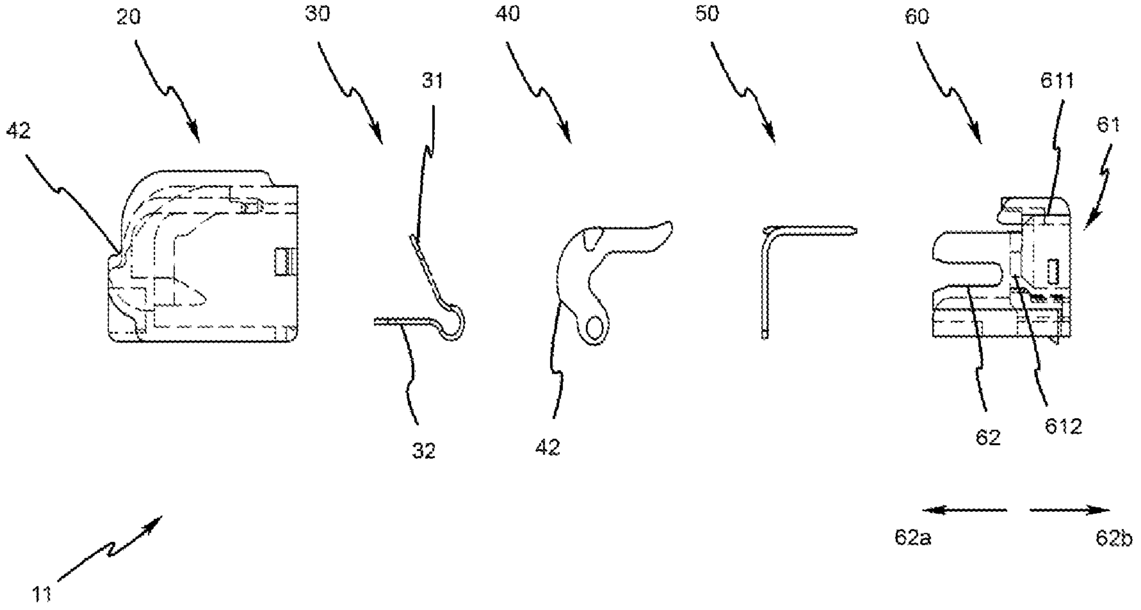
FIG. 1 shows a representative exploded side view of the connection terminal of the invention.

FIG. 1 shows a representative exploded side view of the connection terminal (10) of the invention. The said connection terminal (10) allows at least two cables to be electrically connected. Accordingly, the connection terminal (10) is essentially a junction box/wire connection spring clamp terminal.

Figure 2:
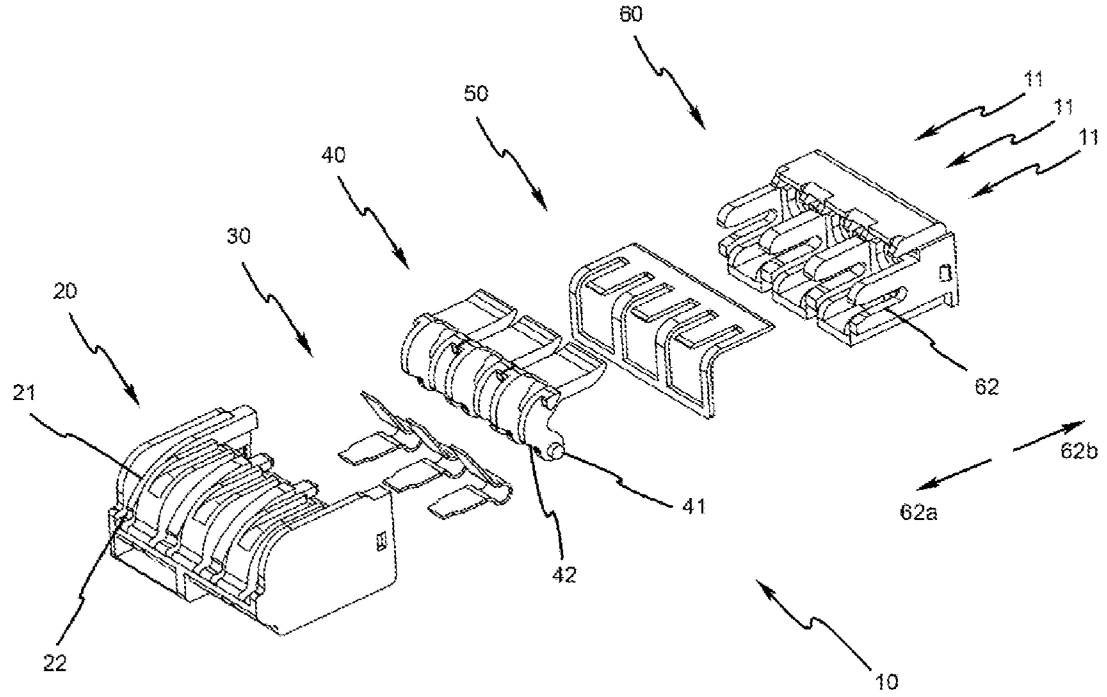
FIG. 2 shows a representative exploded perspective view of the connection terminal of the invention.

The connection terminal includes at least one block (11). The said block (11) is essentially the structure in which each of the cables to be connected is connected. FIG. 2 shows a representative exploded perspective view of a 3-block (11) connection terminal (10). In the use of the connection terminal (10), a connection terminal (10) with the number of blocks is selected according to how many cables will be connected.

The connection terminal (10) includes at least one body (20). The said body (20) serves as a slot for the connection terminal (10) for the components forming the connection terminal (10) with the internal space it has and provides structural integrity. The body (20) is connected with at least one cover (60). The said cover (60) covers the inner space of the body (20) and forms a closed volume for the elements within the connection terminal (10). The body (20) and the cover (60) are made of insulating material. There is at least one cable socket (61) on the cover (60). The said cable socket (61) is a space provided to permit cable passage through it. Accordingly, the cable socket (61) allows the cable to pass from the cover (60) to the body (20). The cables to be electrically connected are placed in the cable sockets (61) on the cover (60).

The cable socket (61) has at least one narrow portion (612). The said narrow portion (612) is such that it can receive the conductive wire portion without insulating material on the cable. The cable socket (61) has at least one wide portion (611). The said wide portion (611) is large enough to accommodate the insulating coated part on the cable.

There is at least one bridge (50) in the body (20). The said bridge (50) is made of conductive material. The bridge (50) extends between the blocks (11) at the connection terminal (10), providing electrical transmission between the blocks (11). Accordingly, the cables to be electrically connected are contacted with the bridge (50) in the body (20). The length of the bridge (50) depends on the number of blocks (11) that the connection terminal (10) has, in other words, the number of cables that are intended to be connected.

There is at least one spring (30) in the body (20). The said spring (30) acts as a pressure on the cable placed in the body (20) to ensure that the cable contacts the bridge (50). The spring (30) has at least one pressing arm (31). The cable is positioned between the bridge (50) and the pressing arm (31).

The body (20) is connected with at least one latch (40). Accordingly, the body (20) includes at least one latch (40) slot that acts as a slot for the said latch (40). The latch (40) serves to control the position of the spring (30) by contacting the spring (30). In other words, the latch (40) ensures that the position of the spring (30) is user-controllable.

The latch (40) includes at least one shaft portion (41). The shaft portion (41) contacts the pressing arm (31). When the shaft portion (41) is moved in the first direction (62*a*), it brings the spring (30) to a loaded position (a). The said loaded position (a) is the position where the cable is disconnected from the bridge (50). The shaft portion (41) is essentially connected to at least one movement channel (62). The said movement channel (62) is located on the cover (60). The movement channel (62) essentially guides the movements of the shaft portion (41) in the first direction (62*a*) and in a second direction (62*b*). Thus, the latch (40) is prevented from dislodging during its movement. The second direction (62*b*) is the opposite direction of the first direction (62*a*). When the shaft portion (41) is moved in the second direction (62*b*) in the movement channel (62), the connection terminal (10) engages a released position (b). The said released position (b) is essentially the position in which force is not exerted by the shaft portion (41) on the pressing arm (31) of the spring (30). In this case, the pressing arm (31) is released and pushes the cable on it toward the bridge (50). The applied pressure prevents the cable from coming out of the connection terminal (10).

There is at least one extension (42) on the latch (40). The said extension (42) rests on at least one sliding surface (21) on the body (20). When the extension (42) is moved in a loading direction (I) on the sliding surface (21), the shaft portion (41) moves in the first direction (62*a*). The shaft portion (41) moves in the second direction (62*b*) when the extension (42) moves in a release direction (II) on the sliding surface (21). There is at least one fixing slot (22) on the body (20). The fixing slot (22) is a groove that is at least partially shaped to receive the extension (42). Accordingly, when the extension (42) reaches the fixing slot (22) by being moved in the said loading direction (I), it is placed in the fixing slot (22). Thus, the block (11) of the connection terminal (10) is fixed in the loaded position (a). In this way, the cable can be easily taken out through the connection terminal (10).

Figure 3:
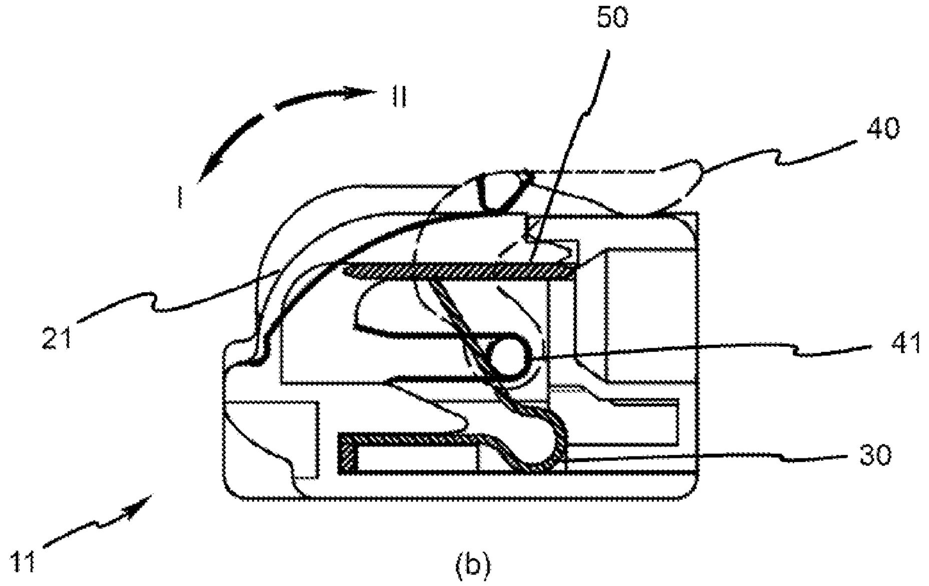
FIG. 3 shows a representative side view of the connection terminal of the invention in the released position.
Figure 4:
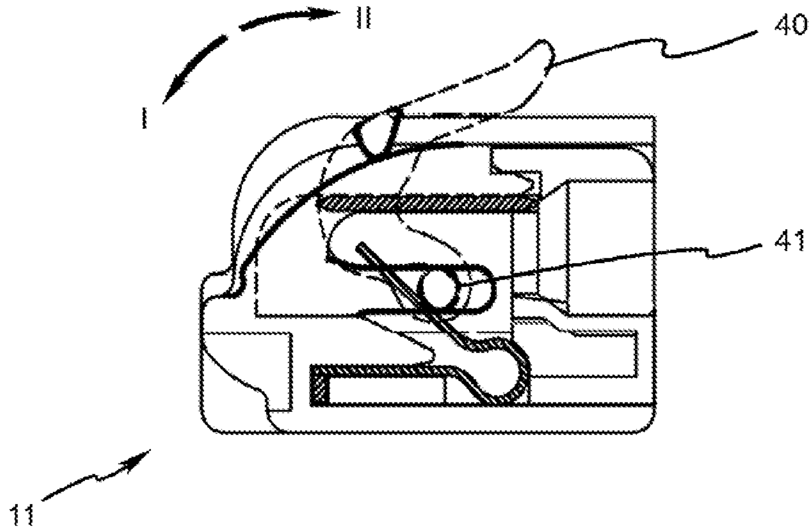
FIG. 4 shows a representative side view of the connection terminal of the invention at the time of connection with the cable.
Figure 5:
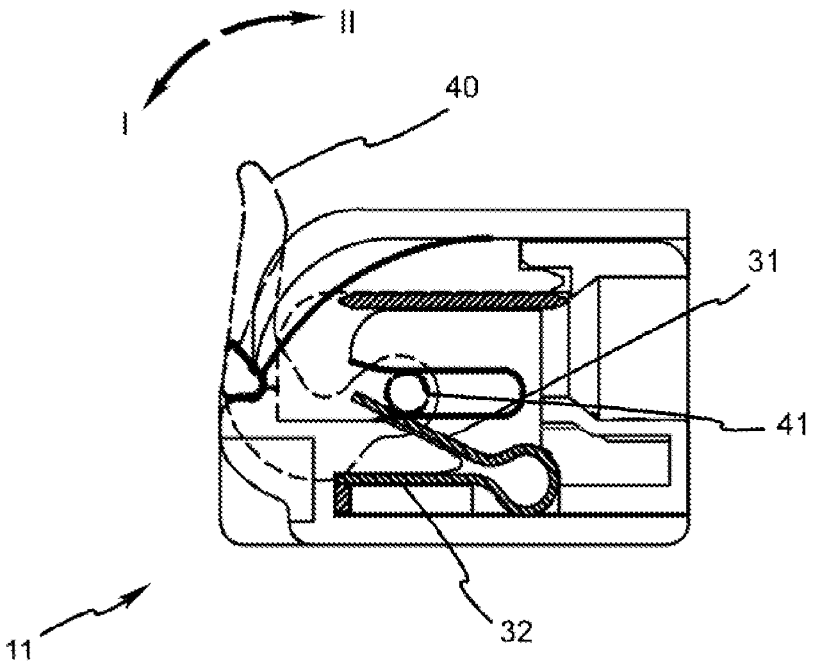
FIG. 5 shows a representative side view of the connection terminal of the invention in the loaded position.

In light of all these explanations, the connection terminal (10) of the invention performs its function according to a possible embodiment of the invention as follows:

FIG. 3-FIG. 5 shows step by step wiring to a block (11) of the connection terminal (10). Accordingly, the cable is taken into the cable socket (61) and pushed toward the body (20). As a result, the cable rests on the pressing arm (31) of the spring (30). As the force continues to be applied, the cable installs the pressing arm (31). Meanwhile, the end of the cable pushes the shaft portion (41) in the first direction (62*a*) together with the pressing arm (31). As a result, the latch (40) reaches the loaded position (a) together with the spring (30). When the cable is in the body (20), the latch (40) is moved toward the release direction (II). Thus, the pressing arm (31) of the spring (30) is released somewhat and presses the conductive end of the cable towards the bridge (50). In this position, the spring (30) prevents the movement of the cable even if the cable is retracted from the body (20). In this way, the cable is fixed in the connection terminal (10).

If the conductive end of the cable used is not rigid enough to push the pressing arm (31), the latch (40) is first moved in the loading direction (I) and the pressing arm (31) is brought to the loaded position (a). As a result, the conductive end of the cable can be brought up to the pressing arm (31) in the loaded position (a) without encountering an obstacle.

When the cable is taken out of the connection terminal (10), the latch (40) is moved in the loading direction (I). Here, the extension (42) on the latch (40) moves along the sliding surface (21) on the body (20). The sliding surface (21) is essentially a radius, outwardly curved surface. It is ensured that the movement of the shaft portion (41) in the first direction (62*a*) is easier by leaning the latch (40) on the sliding surface (21). When the projection sits on the fixing slot (22), the spring (30) moves back to the loaded position (a). In this way, the compressive force applied by the spring (30) to the cable towards the bridge (50) is eliminated. Thus, the cable can be easily taken out of the body (20).

With the connection terminal (10) of the invention, a junction box/cable connection spring clamp terminal suitable for the connection of solid (single core, rigid), ferrule, and flexible (multi-core) cables is put forward. However, unlike the one-way, non-detachable structures in the current art, a connection terminal (10) is put forward with the cable connection removed and attached.

The scope of protection of the invention is specified in the attached claims and cannot be limited to those explained for sampling purposes in this detailed description. It is evident that a person skilled in the art may exhibit similar embodiments in light of the above-mentioned facts without drifting apart from the main theme of the invention.

What is claimed is:

1. A connection terminal for electrically connecting at least two cables, comprising:

a body;

at least one cover, wherein at least one cable socket is fully formed in the at least one cover, and each of the at least two cables is configured to be inserted through the at least one cable socket of the at least one cover into the body;

at least one bridge to provide electrical transmission between the at least two cables;

at least one spring with at least one pressing arm to apply a force on the at least two cables to allow the at least two cables to contact with the at least one bridge; and at least one latch for controlling a position of the at least one spring, wherein the at least one latch comprises at least one shaft portion, wherein the at least one shaft portion contacts the at least one pressing arm to bring the at least one pressing arm to a loaded position where a contact between the at least two cables and the at least one bridge is interrupted when the at least one pressing arm is moved in a first direction;

in order to facilitate a movement of the at least one shaft portion in the first direction, the at least one latch comprises at least one extension, wherein the at least one extension is allowed to make a sliding movement in a loading direction by resting against at least one sliding surface on the body.

2. The connection terminal according to claim 1, wherein the body comprises at least one fixing slot configured to fix the at least one latch in the loaded position by receiving the at least one extension.

3. The connection terminal according to claim 1, wherein the at least one cover is provided with at least one movement channel with a gap provided to guide the movement of the at least one shaft portion in the first direction.

4. The connection terminal according to claim 1, wherein the at least one cable socket comprises at least one narrow portion and at least one wide portion, wherein the at least one narrow portion is sized to receive a conductive end of each of the at least two cables, and the at least one wide portion is wider than the at least one narrow portion and wide enough to receive an insulating coating portion on each of the at least two cables.

* * * * *